US010862936B2

(12) United States Patent
Rodriguez et al.

(10) Patent No.: US 10,862,936 B2
(45) Date of Patent: *Dec. 8, 2020

(54) UNIFIED PLAYBACK POSITION

(71) Applicant: Apple Inc., Cupertino, CA (US)

(72) Inventors: Alejandro A. Rodriguez, San Jose, CA (US); Garrick McFarlane, London (GB); Raymond Neil Walsh, II, San Jose, CA (US); Charles J. Pisula, Bethesda, MD (US); David K. Heller, Los Altos, CA (US); Thomas Alsina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,659

(22) Filed: Jan. 17, 2019

(65) Prior Publication Data

US 2019/0158554 A1     May 23, 2019

Related U.S. Application Data

(63) Continuation of application No. 13/631,508, filed on Sep. 28, 2012, now Pat. No. 10,225,300.

(60) Provisional application No. 61/657,878, filed on Jun. 10, 2012.

(51) Int. Cl.
H04L 29/06          (2006.01)

(52) U.S. Cl.
CPC .......... *H04L 65/60* (2013.01); *H04L 65/1083* (2013.01)

(58) Field of Classification Search
None
See application file for complete search history.

(56) References Cited

U.S. PATENT DOCUMENTS

| 5,926,624 | A | 7/1999 | Katz |
| 6,965,770 | B2 | 11/2005 | Walsh |
| 7,103,906 | B1 | 9/2006 | Katz |
| 7,665,115 | B2 | 2/2010 | Gallo |
| 7,890,599 | B2 | 2/2011 | Kalmanje |
| 7,925,244 | B2 | 4/2011 | Minoer |
| 8,341,557 | B2 | 12/2012 | Pisula |
| 8,614,625 | B2 | 12/2013 | Alsina et al. |
| 8,855,469 | B2 * | 10/2014 | Maharajh ................ G06F 16/48 386/248 |
| 9,179,199 | B2 * | 11/2015 | Alsina ................ H04N 21/6587 |
| 9,430,115 | B1 | 8/2016 | Yun |
| 10,013,233 | B2 * | 7/2018 | Kumar ................ H04L 12/6418 |

(Continued)

OTHER PUBLICATIONS

Amazon.com Help, Amazon.com/gp/help/customer/display.html, downloaded Aug. 2, 2012, 3 pgs.

(Continued)

*Primary Examiner* — Dhairya A Patel
(74) *Attorney, Agent, or Firm* — Blank Rome LLP

(57) ABSTRACT

Improved techniques for interacting with media content so as to provide a unified experience of media content across different client devices in a client-server environment are disclosed. Media content may be displayed on first display of a first client device. Using a server computer, a status of the media content may be communicated from the first client device to a second client device. The media content may be displayed on a second display of the second client device, in accordance with the status of the media content from the first client device.

20 Claims, 13 Drawing Sheets

(56) References Cited

U.S. PATENT DOCUMENTS

| | | | |
|---|---|---|---|
| 10,225,300 B2* | 3/2019 | Rodriguez | H04L 65/1083 |
| 10,313,761 B2* | 6/2019 | Alsina | H04N 21/47217 |
| 2002/0059621 A1 | 5/2002 | Thomas | |
| 2003/0126599 A1 | 7/2003 | Novak | |
| 2003/0236895 A1 | 12/2003 | Ohkubo | |
| 2004/0019658 A1 | 1/2004 | Plastina | |
| 2004/0117310 A1 | 6/2004 | Mendez et al. | |
| 2005/0039133 A1 | 2/2005 | Wells | |
| 2005/0071762 A1 | 3/2005 | Kim et al. | |
| 2005/0097618 A1 | 5/2005 | Arling | |
| 2005/0286546 A1 | 12/2005 | Bassoli | |
| 2006/0002681 A1 | 1/2006 | Spilo | |
| 2006/0161635 A1 | 7/2006 | Lamkin | |
| 2006/0161742 A1 | 7/2006 | Sugimoto | |
| 2007/0055743 A1 | 3/2007 | Pirtle | |
| 2007/0083556 A1 | 4/2007 | Plastina | |
| 2007/0136488 A1 | 6/2007 | Cho | |
| 2007/0180497 A1* | 8/2007 | Popescu | H04L 63/104 726/4 |
| 2007/0198111 A1 | 8/2007 | Oetzel | |
| 2007/0198633 A1 | 8/2007 | Thibeault | |
| 2008/0005195 A1 | 1/2008 | Li | |
| 2008/0028023 A1 | 1/2008 | Locke | |
| 2008/0091606 A1* | 4/2008 | Grecia | G06Q 20/29 705/51 |
| 2008/0183843 A1* | 7/2008 | Gavin | G07F 17/16 709/217 |
| 2008/0235229 A1 | 9/2008 | Kurien | |
| 2009/0106793 A1 | 4/2009 | Tecot | |
| 2009/0158369 A1 | 6/2009 | Van Vleck | |
| 2009/0193101 A1 | 7/2009 | Munetsugu | |
| 2009/0249222 A1 | 10/2009 | Schmidt | |
| 2009/0259711 A1 | 10/2009 | Drieu | |
| 2009/0282443 A1 | 11/2009 | Kim | |
| 2009/0297118 A1 | 12/2009 | Fink | |
| 2010/0053302 A1* | 3/2010 | Ivashin | H04N 7/147 348/14.08 |
| 2010/0293598 A1 | 11/2010 | Collart | |
| 2011/0041059 A1* | 2/2011 | Amarasingham | G11B 27/105 715/716 |
| 2011/0047574 A1 | 2/2011 | Tecot | |
| 2011/0138417 A1 | 6/2011 | Klappert | |
| 2012/0050012 A1 | 3/2012 | Alsina | |
| 2012/0066387 A1* | 3/2012 | Park | H04N 21/433 709/225 |
| 2012/0084455 A1 | 4/2012 | McCue | |
| 2012/0084803 A1 | 4/2012 | Johansson | |
| 2012/0087634 A1 | 4/2012 | Lalwaney | |
| 2012/0130952 A1 | 5/2012 | Kwon | |
| 2012/0210343 A1 | 8/2012 | McCoy | |
| 2012/0210371 A1* | 8/2012 | McCoy | H04N 21/482 725/62 |
| 2012/0227076 A1* | 9/2012 | McCoy | H04N 21/8586 725/110 |
| 2012/0311103 A1 | 12/2012 | Kunigita | |
| 2012/0324489 A1 | 12/2012 | Greenfield | |
| 2013/0006947 A1 | 1/2013 | Akinyemi | |
| 2013/0339998 A1 | 12/2013 | Arme | |
| 2014/0149555 A1 | 5/2014 | Bank | |

OTHER PUBLICATIONS

Global Media Database, Gracenote.com, Jan. 5, 2010, 2 pgs.
Music ID, Gracenote.com, Jan. 5, 2010, 1 pg.
Networked Digital Media Standards: A UPnP/DLNA Overview, Allegro Software Development Corporation, 1740 Massachusetts Avenue, Boxborough, MA, 01719, www.allegrosoft.com, XP007906876, Oct. 26, 2006, 25 pages.
UPnP AV Architecture: 1, XP-002662644, for UPnP Version 1.0, Status: Standardized DCP, Document Version 1.1, Copyright 2008, Contributing Members of the UPnP Forum, http://upnp.org/specs/av/UPnP-av-AVArchitecture-v1-20080930, Sep. 30, 2008, 30 pages.
Lim, Byungsoo, et al., "UPnP Av Transport Service using the Add-in System," Digital Media & Communication R&D Center, Samsung Electronics Co., LTD., Suwon, Korea, 2009 Third International Conference on Next Generation Mobile Applications, Servcies and Technologies, XP031569304, ISBN 978-0-7695-3786-3, Sep. 15, 2009, 6 pages.

* cited by examiner

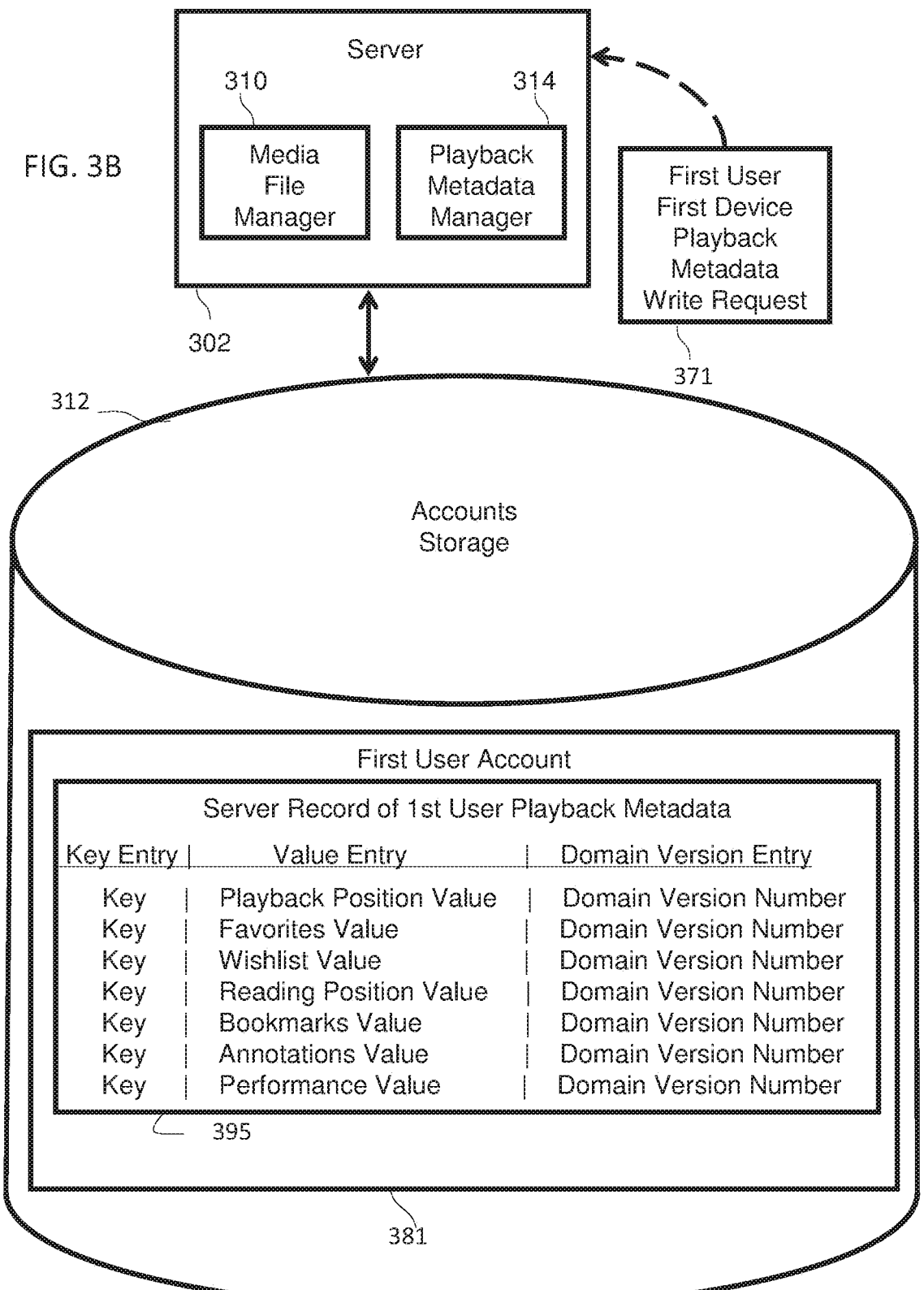

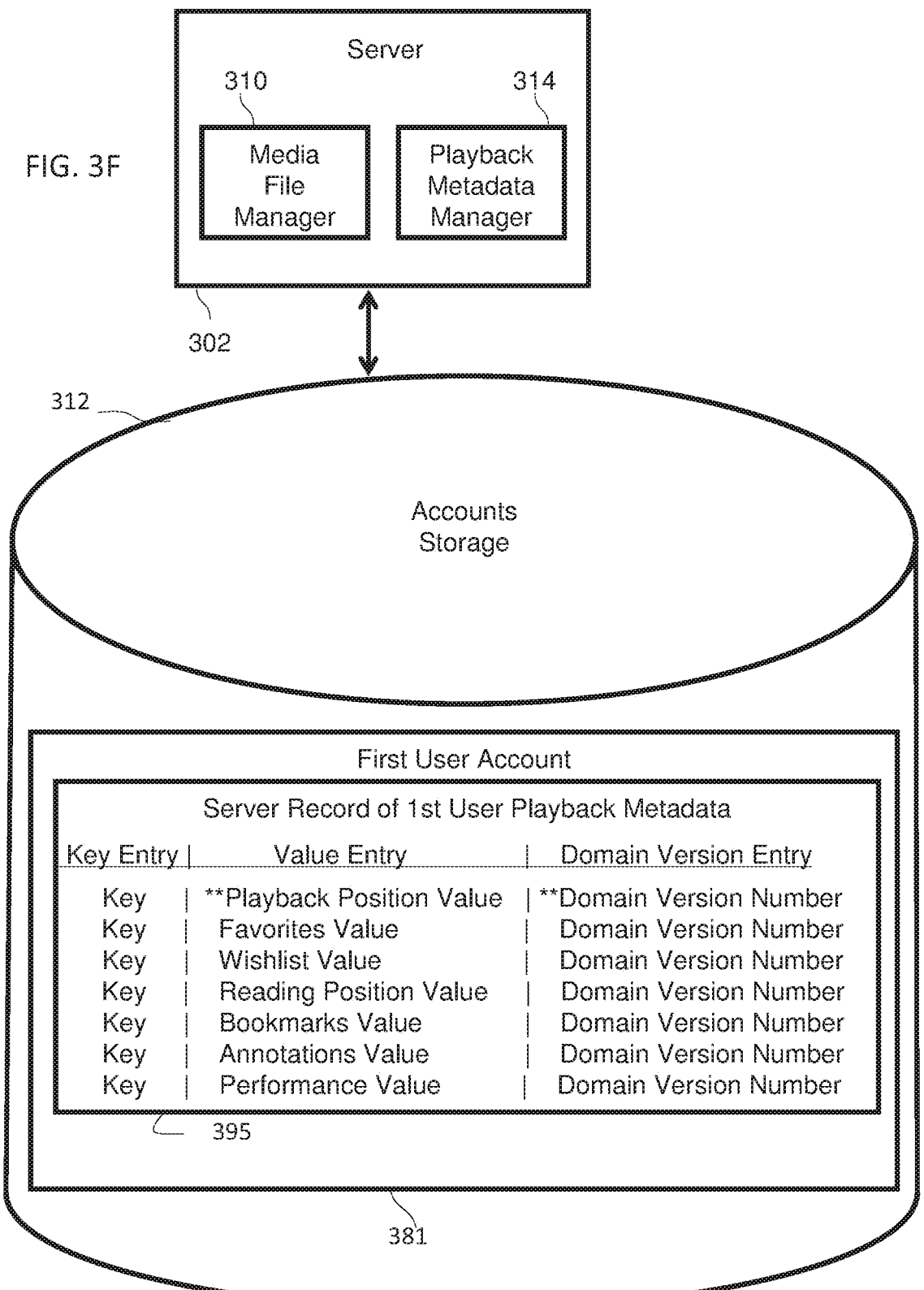

| First User First Device Playback Status Metadata Write Request | | |
|---|---|---|
| Key | Value | Base Version |
| Key | *Playback Position Value | Base Version Number |
| Key | Favorites Value | Base Version Number |
| Key | Wishlist Value | Base Version Number |
| Key | Reading Position Value | Base Version Number |
| Key | Bookmarks Value | Base Version Number |
| Key | Annotations Value | Base Version Number |
| Key | Performance Value | Base Version Number |

Device Identification Number: 441029

UNIFIED PLAYBACK POSITION

CROSS-REFERENCE TO OTHER APPLICATION

This application is a continuation of U.S. patent application Ser. No. 13/631,508, filed Sep. 28, 2012, entitled "UNIFIED PLAYBACK POSITION," claims priority to U.S. Provisional Patent Application No. 61/657,878, filed Jun. 10, 2012, entitled "UNIFIED PLAYBACK POSITION," which is herein incorporated by reference.

BACKGROUND OF THE INVENTION

Today, powered by recent advances in digital media technology, there is a rapid increase in a variety of different ways of interacting with digital media content, such as images (e.g., photos), text, audio items (e.g., audio files, including music or songs), or videos (e.g., movies). In the past, consumers were constrained to interacting with digital media content on their desktop or in their living room of their home. Today, portability lets people enjoy digital media content at any time and in any place, using a variety of different media devices.

While portability of media content and availability of a variety of different media devices with different sizes, weights and capabilities offers many options to users, some challenges still remain. One difficulty is that interaction with media content across different devices may be tedious, difficult or confusing to some users. Further, while in any given set of circumstances, one device may be preferred over another, changing from one device to another tends to be difficult, confusing or inconvenient.

For example, while a full size device may provide a rich experience of a football game video at home, circumstances change when a viewer is interrupted by needing to leave home, for example, to catch a ride to the airport. Under such changed circumstances, a portable device would be needed to view the video. The user would need to provide the football game video to the portable device and thereafter start playback of the video while riding to the airport. Hence, a significant amount of care and effort is required for a user to change between devices.

Thus, there is a need for improved techniques for interacting with media content across different devices in a client-server environment.

SUMMARY

Improved techniques are disclosed for interacting with media content so as to provide a unified playback experience of the media content across different devices in a client-server environment. The media content may comprise digital media content, such as images (e.g., photos), text, audio items (e.g., audio files, including music or songs or podcasts), or videos (e.g., movies).

Media content may be displayed on a first display of a first client device. Using a server computer, playback status of the media content maybe communicated from the first client device to a second client device. The media content may be displayed on a second display of the second client device, in accordance with playback status of the media content from the first client device.

Similarly, using the server computer, playback status of the media content may be communicated from the second client device to the first client device. The media content may be displayed on the first display of the first client device, in accordance with playback status of the media content from the second client device.

For example, one of the client devices may comprise a handheld multifunction device capable of various media activities, such as playing or displaying each of images (e.g., photos), text, audio items (e.g., audio files, including music or songs or podcasts), and videos (e.g., movies) in digital form. Another one of the client devices may comprise anon-handheld base computing unit, which is also capable of such various media activities. Using the server computer and playback status communications between the server and the client devices, interaction with media content across different devices may be managed. Further, while in any given set of circumstances, one client device may be preferred over another, changing from experiencing playback of media content on one client device to experiencing playback of media content on another client device may be facilitated by unifying access to playback status across the various client devices.

The invention can be implemented in numerous ways, including as a method, system, device, apparatus, or computer readable medium. Several embodiments of the invention are discussed below.

As a computer implemented method for unifying playback status access across a plurality of client devices the invention includes at least the acts of: receiving a write request for playback status metadata at a server via a computer network from a first client device, wherein the playback status metadata is descriptive of a playback status of media content on the first client device, and retrieving a server record relating to the playback status metadata.

As a computer implemented method for updating playback status the invention includes at least the acts of: receiving a write request at a server via a computer network from a portable multifunction client device and descriptive of a playback status of displaying media content on a touch screen display of the portable multifunction client device, and updating using the server to generate an updated record of playback status of the media content in response to receiving the write request from the portable multifunction client device.

As a computer implemented method for managing playback status access for a plurality of client devices the invention includes at least the acts of: receiving a first write request for playback status metadata at a server via a computer network from a first client device of a first user, wherein the playback status metadata of the first write request is descriptive of a playback status of media content on the first client device of the first user, and receiving a second write request for playback status metadata at the server via the computer network from a first client device of a second user, wherein the playback status metadata of the second write request is descriptive of a playback status of media content on the first client device of the second user.

As a computer system for managing playback status access for a plurality of client devices one embodiment includes at least a server computer; a first client device of a first user coupled with the server computer and configured for transmitting a first write request for playback status metadata to the server computer, wherein the playback status metadata of the first write request is descriptive of a playback status of media content on the first client device of the first user; and a second client device of the first user coupled with the server computer and configured for transmitting a first read request for playback status metadata to the server computer.

Other aspects and advantages of the invention will become apparent from the following detailed description taken in conjunction with the accompanying drawings.

BRIEF DESCRIPTION OF THE DRAWINGS

The invention will be readily understood by the following detailed description in conjunction with the accompanying drawings, wherein like reference numerals designate like structural elements, and in which:

FIGS. 3A-3G are simplified, more detailed block diagrams illustrating operation of the computer system shown in FIGS. 1 and 2.

FIG. 4 is a detailed diagram illustrating an example of the write request for playback status metadata as shown in FIG. 3B.

DETAILED DESCRIPTION OF EMBODIMENTS OF THE INVENTION

Figure 1:
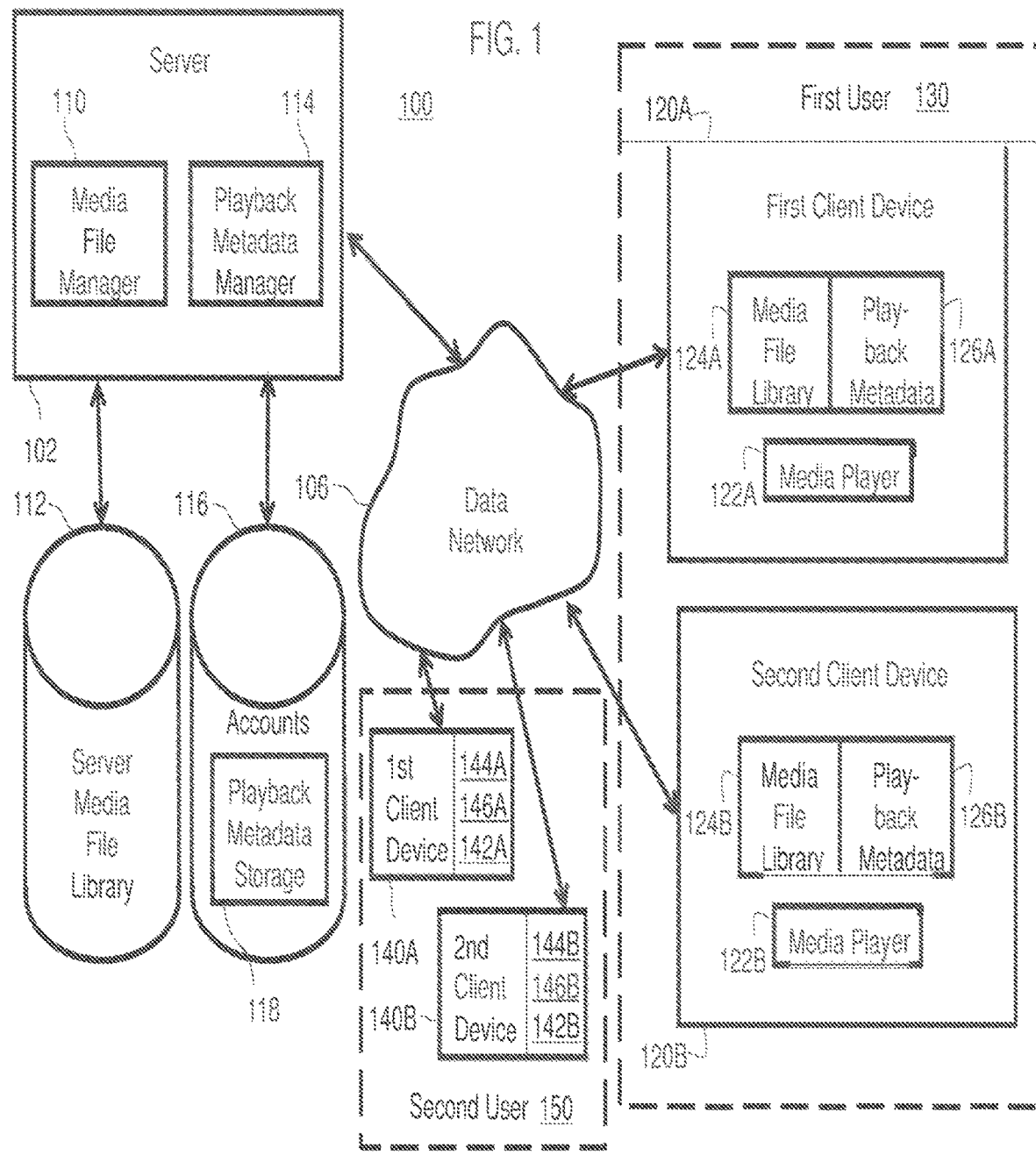
FIG. 1 is a block diagram of a computer system for managing playback status access for a plurality of client devices according to one embodiment.

The invention relates to improved techniques and systems for interacting with media content so as to provide a unified playback experience of the media content across different devices in a client-server environment. The media content may comprise digital media content, such as images (e.g., photos), text, audio items (e.g., audio files, including music or songs or podcasts), or videos (e.g., movies).

Media content may be displayed on a first display of a first client device. Using a server computer, playback status of the media content maybe communicated from the first client device to a second client device. The media content may be displayed on a second display of the second client device, in accordance with playback status of the media content from the first client device.

For example, playback status of the first client device may be a status of paused at a particular playback position of the media content, when a first user pauses playback of the media content on the first client device. The first client device may communicate the playback status of the first client device to the server. The server may update a server record relating to the first user and/or the playback status of the media content on the first client device. The server may communicate to the second client device the playback status of the first client device. The media content may be displayed on the second display of the second client device, in accordance with playback status of the media content from the first client device. More specifically, in this particular example, media content may be displayed on the second client device in accordance with the status of paused at the particular playback position of the media content just discussed. Playback of the media content may resume on the second client device at the particular playback position where the media content was paused on the first client device.

Similarly, using the server computer, playback status of the media content may be communicated from the second client device to the first client device. The media content may be displayed on the first display of the first client device, in accordance with playback status of the media content from the second client device.

For example, one of the client devices may comprise a handheld multifunction device capable of various media activities, such as playing or displaying each of images (e.g., photos), text, audio items (e.g., audio files, including music or songs), and videos (e.g., movies) in digital form. Another one of the client devices may comprise anon-handheld base computing unit, which is also capable of such various media activities. Using the server computer, and playback status communications between the server and the client devices, interaction with media content across different devices may be managed. Further, while in any given set of circumstances, one client device may be preferred over another, changing from experiencing playback of media content on one client device to experiencing playback of media content on another client device may be facilitated by unifying access to playback status across the various client devices.

Embodiments of the invention are discussed below with reference to FIGS. 1-7. However, those skilled in the art will readily appreciate that the detailed description given herein with respect to these figures is for explanatory purposes as the invention extends beyond these limited embodiments.

FIG. 1 is a block diagram of a computer system 100 for managing playback status access for a plurality of client devices according to one embodiment. The computer system 100 may comprise a server computer 102.

As shown in FIG. 1, server computer 102 may be coupled to each of a plurality of client devices 120A, 120B, 140A, 140B of computer system 100 via data network 106. In one embodiment, the data network 106 comprises at least a portion of the Internet. Each of the client devices 120A, 120B, 140A, 140B may comprise a respective computer running software for interacting over data network 106 with software modules running on server computer 102 for a media file manager 110, as well as a playback status metadata manager 114.

The server computer 102 may coordinate obtaining, storing, and/or accessing digital media items using the digital media file manager 110. As will be discussed in greater detail subsequently herein, the server computer 102 can also manage playback status access for various client devices, and more particularly may update records of playback status, using the playback status metadata manager 114.

Each digital media item, or more particularly each digital media file for each digital media item, may be uniquely identified by a media file identification number. Media file identification numbers of the digital media files may be generated in various ways. For example, if a media file identification number is not already assigned to identify a digital media file, a hashing function may be used to generate the media file identification number by hashing metadata associated with the digital media file (e.g. by hashing a name of the digital media file together with other descriptive metadata, for example, an episode description). To facilitate storage of the digital media items, and to manage access to digital media items, the digital media file manager 110 of server computer 102 may be coupled with a server digital media file library 112. The server digital media file library 112 may store digital media items accessible within computer system 100.

Each one of various client devices may be uniquely identified by its respective client device identification number. Respective client device identification numbers may be electronically stored within each client device, and may be accessible over data network 106 by coupling of the various client devices thereto.

Each user of the computer system 100 may have a respective user account. A first plurality of client devices may be associated with a grouping of a first user and/or first user account, by associating the client device identification numbers of such client devices with the grouping of the first user and/or first user account. Such association may be recorded in a first user device record, which may be managed by server computer 102.

The foregoing is illustrated in FIG. 1 by first and second client devices 120A and 120B of a first user. The first and second client devices 120A and 120B may each be uniquely identified by their respective device identification numbers. The first and second client devices 120A and 120B may be associated with the grouping of the first user and/or first user account 130, by associating the client device identification numbers of such client devices with the grouping of the first user and/or first user account 130. In FIG. 1 the foregoing is representatively illustrated using a first dashed line box with the legend "First User 130", so as to show association of the first and second client devices 120A and 120B with the grouping of the first user and/or first user account 130.

As mentioned previously, such association may be recorded in the first user device record, which may be managed by server computer 102. Accordingly, in light of such association, it should be understood that the server computer 102 can identify the first user and/or first user account when any of the client devices of the first user access the server computer using device identification numbers of such client devices of the first user.

Similarly, FIG. 1 shows first and second client devices 140A and 140B of a second user. The first and second client devices 140A and 140B of the second user may each be uniquely identified by their respective device identification numbers. The first and second client devices 140A and 140B of the second user may be associated with a grouping of the second user and/or second user account 150, by associating the client device identification numbers of such client devices with the grouping of the second user and/or second user account 150. In FIG. 1 the foregoing is representatively illustrated using a second dashed line box with the legend "Second User 150", so as to show association of the first and second client devices 140A and 140B of the second user with the grouping of the second user and/or second user account 150.

Such association may be recorded in a second user device record, which may be managed by server computer 102. Accordingly, in light of such association, it should be understood that the server computer 102 can identify the second user and/or second user account when any of the client devices of the second user access the server computer using device identification numbers of such client devices of the second user.

Each of the client devices 120A, 120B, 140A, 140B of computer system 100 may have its own respective digital media file library 124A, 124B, 144A, 144B and digital media player 122A, 122B, 142A, 142B for playing digital media items from its digital media file library. The client devices 120A, 120B, 140A, 140B can vary with application but generally are network accessible computing devices that have memory storage. Often, the clients 120A, 120B, 140A, 140B are personal computers or other computing devices (e.g., PDA, portable digital media player, mobile telephone) that may be capable of storing and displaying and/or otherwise presenting digital media to their users. Each of the digital media players 122A, 122B, 142A, 142B can be an application program (e.g., specific software application or web browser program) that operates on the client devices 120A, 120B, 140A, 140B. One popular example of the digital media player is the iTunes® client software.

The media file manager 110 of server 102 can facilitate synchronizing presence of digital media items in digital media file libraries within each grouping of client devices within by user and/or user account. For example, media file manager 110 of server 102 can facilitate synchronizing presence of digital media items in digital media file libraries 124A, 124B of the first and second client devices 120A, 120B of the first user, since the first and second client devices 120A, 120B are associated with the grouping of the first user and/or first user account 130. By synchronizing and/or mirroring presence of digital media items in digital media file libraries 124A, 124B of the first and second client devices 120A, 120B, the digital media items are conveniently available to be played by the first user on both of the first and second client devices 120A, 120B.

For example, if a media item present on one client device of the first user is absent from another client device of the first user, the media file manager 110 of server 102 can facilitate providing the first user with access to any such missing media items on any or all client devices of the first user by synchronizing and/or mirroring the digital media file libraries 124A, 124B. In some embodiments, to provide for such synchronization, the media file manager 110 of the server 102 may locate in the server media file library 112 the digital media file for the digital media item that is missing from one of the client devices, and transmit this digital media file to that one of the client devices.

Similarly, the media file manager 110 of server 102 can likewise facilitate synchronizing presence of digital media items in digital media file libraries of the first and second client devices 140A, 140B of the second user, since the first and second client devices 140A, 140B are associated with the grouping of the second user and/or second user account 150.

In some implementations, some or all of the digital media files contained within the digital media file libraries 124A, 124B, 144A, 144B may be associated with playback status metadata 126A, 126B, 146A, 146B. For example, on the first client device 120A of the first user, a digital media file of a particular video media item may be associated with playback status metadata 126A of a playback position value. For example, playback status of the digital media file may be a status of paused at a particular playback position of the video media item, when the first user pauses playback of the video media item on the first client device 120A. Playback status of the digital media file may comprise a status describing whether the digital media file has been played and/or a status describing a number of times the digital medial file has been played.

The first client device 120A may communicate the playback status of the first client device to the server 102 via the data network 106, for example, by sending a first write request for playback status metadata to the playback status metadata manager 114 of the server 102. The playback status metadata 126 may be descriptive of the playback status of the digital media file (e.g. video media item) on the first client device 120A. For example, the playback status metadata 126A may comprise the playback position value relating to the pause status of the particular video media item, as just discussed.

Furthermore, when the playback status metadata manager 114 of server 102 receives the first write request for playback status metadata from the first client device 120A, the first write request may identify the digital media file that is related to the playback status metadata, for example, by using the media file identification number for the digital media file.

Additionally, the first write request may identify the first user account and/or the first user. Such identification may be direct, or maybe indirect. For example, the first write request may include the device identification number of the first client device 120A. For example, the first client device 120A may have a client device identification number "441029". As mentioned previously, using associations that may be recorded in the first user device record, server computer 102 can identify the first user and/or first user account when any of the client devices 120A, 120B of the first user access the server computer 102 using device identification numbers of such client devices of the first user.

Furthermore, the first write request may include one or more namespaces, which may comprise one or more of various playback status metadata type namespaces that relate to the playback status metadata. For example, the first write request may comprise a designation of a playback position namespace (e.g. "position") that relates to the playback position value in the playback status metadata for the particular video item.

The various identification items just discussed may be included together in the first write request. Any of the various identification items just discussed may comprise a key in the first write request. For example, the digital media file (e.g. video media item) that has the paused status on the first client device 120A and is related to the playback status metadata of the first write request may have a media file identification number "5512345"; and the first write request may comprise the designation of the playback position namespace (e.g. "position"). Accordingly, in this example, the various identification items may comprise a key in the first write request of "5512345. position". In the first write request, this key may be associated with the playback position value of the playback status metadata to provide a key-value pair. This key-value pair may also be associated with a base version number, which may be an integer (which can be incremented) for tracking revisions of the playback status metadata 126A on the first client device 120A.

When the playback status metadata manager 114 of server 102 receives the first write request for playback status metadata from the first client device 120A, the playback status metadata manager 114 may identify an account of the first user using the client device identification number (e.g. "441029") of the first client device 120A, and may use the key (e.g. 5512345. position) to locate and retrieve a server record in the first user account of playback status metadata storage 118 in accounts storage 116. This server record may relate to playback status of playback position (e.g. "position") of the particular digital media file (e.g. "5512345") for the first user. Additionally, this server record may comprise a domain version number, which may be an integer (which can be incremented) for tracking revisions of the playback status metadata in the account of the first user in the playback status metadata storage 118 in the accounts storage 116.

The playback status metadata manager 114 of server 102 may compare the domain version number of the server record and the base version number of the playback status metadata of the first write request. The playback status metadata manager 114 of server 102 may transmit a version conflict notification to the first client device 120A based upon comparison of the domain version number of the server record and the base version number of the playback status metadata of the first write request (for example, if the comparison shows that the base version number is smaller, or earlier than the domain version number). The playback status metadata manager 114 of server 102 may determine whether to update the server record based at least in part upon the comparison of the base version number of the playback status metadata of the first write request and the domain version number of the server record. Once the playback status metadata manager 114 of server 102 has determined to update the server record, the playback status metadata manager 114 may update the server record and may store the updated server record metadata in the account of the first user in the playback status metadata storage 118 in the accounts storage 116. Further, the domain version number may be updated when the server record is updated.

The server 102 may be coupled to accounts storage 116 for the various users of computer system 100. In general, each user account in the accounts storage 116 may have respective playback status metadata storage 118 for each user. The accounts storage 116 may comprise a database, and may be accessed by the playback status metadata manager 114 of server 102, for accessing and/or retrieving and/or updating server records relating to the various users. In particular, the playback status metadata manager 114 of server 102 may access and/or retrieve and/or update server records relating to playback status of digital media files by each of the users of the computer system 100. Accordingly, the playback status metadata manager 114 of server 102 may access and/or retrieve and/or update the server record relating to the first user and/or the playback status of the digital media file (e.g. video media item).

The server 102 may communicate to the second client device 120B the playback status of the first client device 120A. For example, the playback status metadata manager 114 of server 102 may receive a first read request for playback status metadata from the second client device 120B.

When the playback status metadata manager 114 of server 102 receives the first read request for playback status metadata from the second client device 120B, the first read request may identify the digital media file that is related to the first read request, for example, by using the media file identification number for the digital media file. Additionally, the first read request may identify the first user account and/or the first user. As discussed previously, such identification may be direct, or may be indirect. For example, the first read request may include the device identification number of the second client device 120B. For example, the second client device 120B may have a client device identification number "441030". As mentioned previously, using associations that may be recorded in the first user device record, server computer 102 can identify the first user and/or first user account when any of the client devices 120A, 120B of the first user access the server computer 102 using device identification numbers of such client devices of the first user.

Furthermore, the first read request may include one or more namespaces, which may comprise one or more of various playback status metadata type namespaces that relate to the playback status metadata. For example, the first read request may comprise the designation of the playback position namespace (e.g. "position") that relates to the playback position value in the playback status metadata for the particular video item.

Just as discussed previously herein with respect to the first write request of the first client device 120, the various identification items just discussed may be included together in the first read request. Any of the various identification items just discussed may comprise a key in the first read request. For example, the digital media file (e.g. video media item) that has the paused status at the pause position on the first client device 120A and is to be resumed for play starting from the pause position on the second client device may have the media file identification number "5512345"; and the first read request may comprise the designation of the playback position namespace (e.g. "position"). Accordingly, just as with the first write request discussed previously, in this example, the various identification items may comprise a key in the first read request of "5512345. position". In the first read request, this key may be associated with the playback position value of the playback status metadata to provide the key-value pair. This key-value pair may also be associated with a base version number, which may be an integer (which can be incremented) for tracking revisions of the playback status metadata 126B on the second client device 120B.

When the playback status metadata manager 114 of server 102 receives the first read request for playback status metadata from the second client device 120B, the playback status metadata manager 114 may identify an account of the first user using the client device identification number (e.g. "441030") of the second client device 120B, and may use the key (e.g. "5512345. position") to locate and retrieve a server record (which in this example, may be the updated server record, as discussed previously) in the first user account of playback status metadata storage 118 in accounts storage 116. This server record may relate to playback status of playback position (e.g. "position") of the particular digital media file (e.g. "5512345") for the first user. Additionally, this server record may comprise the domain version number, as discussed previously. The playback status metadata manager 114 may compare the domain version number to the base version number of the first read request.

Once the server record of the playback status metadata is retrieved, the playback status metadata manager 114 of server 102 may transmit the playback status metadata to the second client device 120B in response to the first read request from the second client device. The digital media file (e.g. video media item) may be displayed on the display of the second client device 120B, in accordance with playback status of the media content from the first client device 120A. More specifically, in this particular example, the digital media file may be displayed on the second client device 120B in accordance with the status of paused at the particular playback position of the digital media file as discussed previously. Playback of the digital media file may resume on the second client device 120B at the particular playback position where the media content was paused on the first client device 120A.

In the example just discussed the first user can pause play of the particular digital media file at a particular playback position on the first client device 120A of the first user, and then resume play of the particular digital media file at that particular playback position on the second client device 120B of the first user. This may be facilitated by the playback status metadata manager 114 of server computer 102 receiving the first write request for playback status metadata from the first client device 120A of the first user.

For example, the first client device 120A may initiate the first write request when playback is paused on the first client device. The playback status metadata manager 114 of server computer 102 may receive the first read request for playback status metadata from the second device 120B of the first user. For example, the second client device 120B may initiate the first read request when the second client device 120B is activated, or may initiate the first read request when the second client device 120B engages in a media activity.

In some embodiments that first client device 120A may be a portable multifunction client device 120A having a touchscreen display. In such case, the first write request for playback status metadata may be descriptive of playback status of displaying media content on the touchscreen display of the portable multifunction client device. In particular, the first write request may be descriptive of status of progress of the portable multifunction device 120A in playing the media content on the touch screen display. The receiving of the first write request at the server computer 102 may be in response to a predefined gesture on the touch screen display or a media activity of the portable multifunction client device.

The receiving of the first write request at the server computer 102 may be in response to pausing or stopping of the displaying media content on the touch screen display of the portable multifunction client device 120A. The first write request may be descriptive of a playback position of the pausing or stopping of the displaying media content on the touch screen display of the portable multifunction client device 120A.

The playback status metadata manager 114 of server computer 102 may generate an updated record of playback status of the media content in response to receiving the first write request from the portable multifunction client device 120A. The playback status metadata manager 114 of server computer 102 may store the updated record of playback status of the media content in the first user account of playback status metadata storage 118 in accounts storage 116.

In some embodiments, the second client device 120B of the first user may be may be a remote client device 120B with a remote display. The playback status metadata manager 114 of server computer 102 may receive the first read request from remote client device 120B. The receiving of the first read request at the server computer 102 may be in response to a media activity of the remote client device 120B.

The playback status metadata manager 114 of server computer 102 may transmit the updated record of playback status of the media content to the remote client device 120B. The transmitting of the updated record of playback status of the media content from the server computer 102 to the remote client 120B may provide for display of the media content on the remote display of the remote client 120B in accordance with the status of the portable multifunction client device 120A. In particular, the transmitting the updated record of playback status of the media content from the server computer 102 to the remote client device 120B may provide for playing the media content on the remote display in accordance with the status of progress of the portable multifunction client device 120A in playing the media content on the touch screen display. The transmitting of the updated record of playback status of the media content from the server computer 102 to the remote client device 120B may provide for resuming playback display of the media content on the remote display of the remote client device, in accordance with the playback position of the pausing or stopping of the displaying media content on the touch screen display of the portable multifunction client device 120A.

While the foregoing examples focused on the media activity of the first user on the first and second client devices 120A, 120B of the first user, the computer system 100 may likewise accommodate media activity of the second user, on the first and second client devices 140A, 140B of the second user. The second user can pause play of the particular digital media file just discussed (the same or different media file) at a particular playback position on the first client device 140A of the second user, and then resume play of the particular digital media file at that particular playback position on the second client device 140B of the second user. This may be facilitated by the playback status metadata manager 114 of server computer 102 receiving a second write request for playback status metadata from the first client device 140A of the second user. The playback status metadata manager 114 of server computer 102 may receive a second read request for playback status metadata from the second device 140B of the second user.

Figure 2:
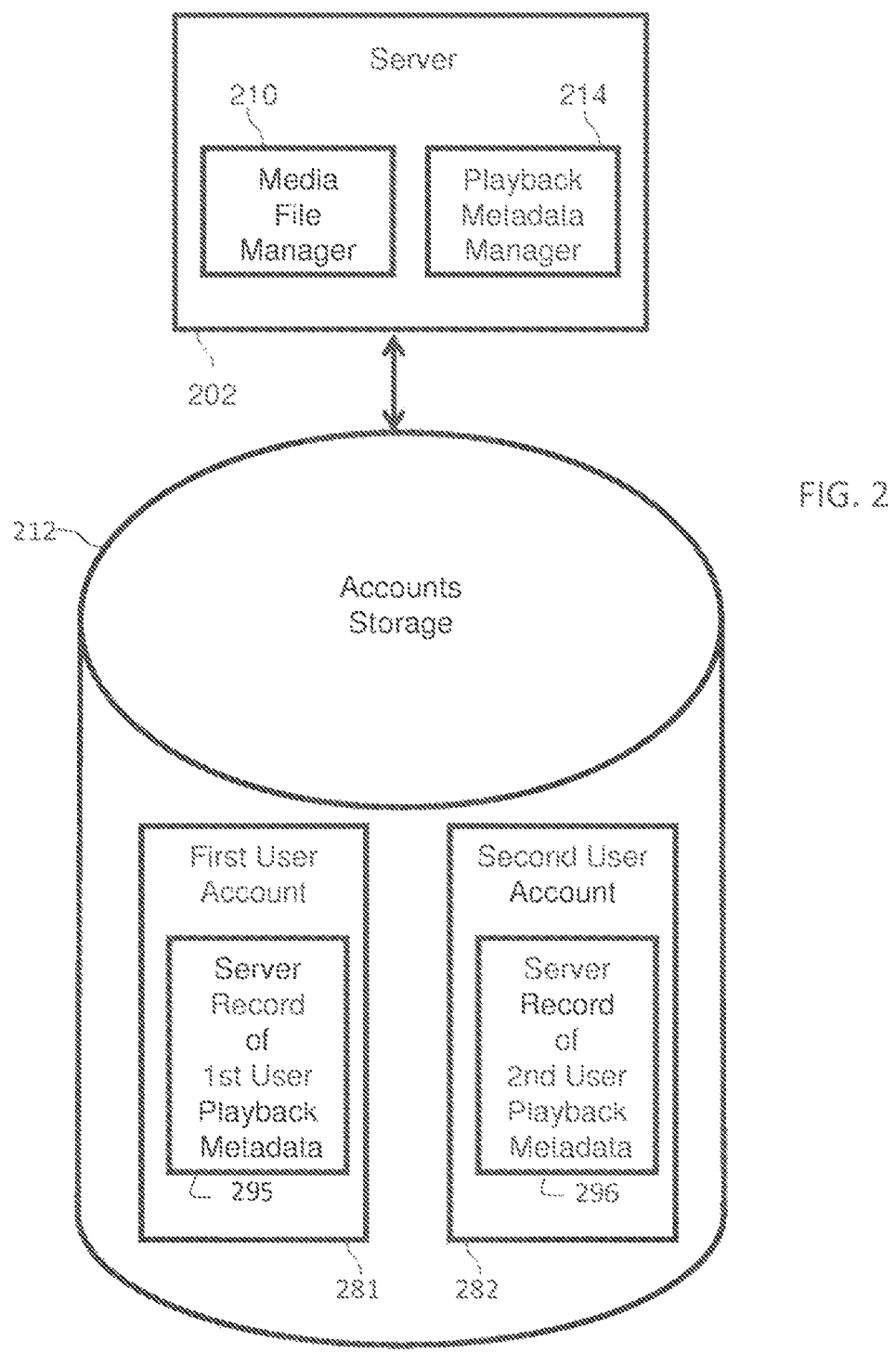
FIG. 2 is a simplified detailed block diagram illustrating the computer system shown in FIG. 1.

FIG. 2 is a simplified detailed block diagram illustrating the computer system 100 shown in FIG. 1. FIG. 2 shows media file manager 210 and playback status metadata manager 214 of server computer 202. The playback status metadata manager 214 of server computer 202 may be coupled to accounts storage 212 for accessing and/or retrieving and/or updating the server record 295 of the first user playback status metadata in the first user account 281. Similarly, the playback status metadata manager 214 of server computer 202 may be coupled to accounts storage 212 for accessing and/or retrieving and/or updating the server record 296 of the second user playback status metadata in the second user account 282.

The playback status metadata manager 214 of server computer 202 may be coupled to accounts storage 212 for accessing and/or retrieving and/or updating a respective domain-wide version number, which may be associated with each user account 281, 282. For each user account 281, 282 the playback status metadata manager 214 may update (e.g. increment) the respective domain-wide version number when server records associated with each user account 281, 282 are updated.

The respective domain-wide version number associated with each user account 281, 282 may be employed by the playback status metadata manager 214 for improving speed and/or efficiency in updating playback status metadata for respective client devices associated with each user account 281, 282. In other words, the respective domain-wide version number associated with each user account 281, 282 may be used by the playback status metadata manager 214 as a fast way for client devices associated with each user account 281, 282 to request all changes for each user account 281, 282 since the last (most recent previous) update request. In this way, using the respective domain-wide version number for each user account, server computer 202 may avoid transmitting, and client devices may avoid requesting and/or receiving, records that were not updated since the last (most recent previous) update request for each user account. Using the respective domain-wide version number for each user account, client devices may request and/or receive only records that were updated since the last (most recent previous) update request for each user account (i.e. "delta" or difference records that are different or updated.)

For example the playback status metadata manager 214 of server computer 202 may be coupled to accounts storage 212 for accessing and/or retrieving and/or updating a first domain-wide version number, which may be associated with first user account 281. For the first user account 281, the playback status metadata manager 214 may update (e.g. increment) the first domain-wide version number when server records associated with first user account are updated.

The first domain-wide version number associated with the first user account 281 may be employed by the playback status metadata manager 214 for improving speed and/or efficiency in updating playback status metadata for first and second client devices of the first user, which may be associated with first user account 281. In other words, the first domain-wide version number associated with the first user account 281 may be used by the playback status metadata manager 214 as a fast way for client devices of the first user to request all changes for the first user account 281 since the last (most recent previous) update request. In this way, using the first domain-wide version number, client devices of the first user may avoid requesting and/or receiving records that were not updated since the last (most recent previous) update request. Using the first domain-wide version number, client devices of the first user may request and/or receive only records that were updated since the last (most recent previous) update request for the first user account.

Similarly, the playback status metadata manager 214 of server computer 202 may be coupled to accounts storage 212 for likewise accessing and/or retrieving and/or updating a second domain-wide version number, which may be associated with the second user account 282. Using the second domain-wide version number, client devices of the second user may request and/or receive only records that were updated since the last (most recent previous) update request for the second user account.

FIGS. 3A-3G are simplified, more detailed block diagrams illustrating operation of the computer system shown in FIGS. 1 and 2. FIGS. 3A-3G show media file manager 310 and playback status metadata manager 314 of server computer 302. As shown in FIGS. 3A-3G, the playback status metadata manager 314 of server computer 302 may be coupled to accounts storage 312 for accessing and/or retrieving and/or updating the server record 395 of the first user playback status metadata in the first user account 381.

The server record 395 may have key entries of keys related to playback status metadata of the first user; value entries of values related to playback status metadata of the first user; and domain version entries of domain version numbers related to playback status metadata in the server record. The server record 395 may have associations between keys related to playback status metadata of the first user, values related to playback status metadata of the first user and domain version numbers related to playback status metadata in the server record, as illustrated using rows in the figures. In other words, in the figures each row of key, value and domain version number illustrates an association between that key, value and domain version number.

Additionally, while the playback position value of the playback status metadata has already been discussed, various additional value entries of the playback status metadata are shown in FIGS. 3A-3G. A favorites value of the playback status metadata may provide information relating to how the first user favors the media item corresponding such playback status metadata. A wish list value of the playback status metadata may provide information relating to how the first user prioritizes in a wish list the media item corresponding to such playback status metadata. A reading position value of the playback status metadata may provide information relating where the first user has paused reading an electronic book media item corresponding such playback status metadata. A bookmarks value of the playback status metadata may provide information relating positions of particular interest to the first user reading an electronic book media item corresponding to such playback status metadata. An annotations value of the playback status metadata may provide information relating annotations of the first user made during playback of the media item corresponding such playback status metadata. A performance value of the playback status metadata may provide information relating client device performance experienced by the first user during playback of the media item corresponding to such playback status metadata.

In addition to what is explicitly shown in the figures, the server record 395 may further comprise additional data related to playback status for each particular digital media file, as identified by each media file identification number of each key. The server record 395 may further comprise respective "has been played" values for indicating whether each of the digital media files has been played. The "has been played" values may be Boolean values. When client devices of the first user are updated using the server record 395, the client devices may display a listing of the digital media files, and may display an indicator (e.g. a blue dot) adjacent to digital media files that have not been played (e.g. digital media files associated with "has been played" values of "0"). The server record 395 may further comprise respective "number of plays" values for indicating number of times that each of the digital media files has been played. If a value of "has been played" is "1" and a value of "number of plays" is greater than, or equal to "1", then the client device may display another indicator (e.g. absence of a blue dot) adjacent to digital media files associated with such values. If a value of "has been played" is "1" and a value of "number of plays" is less than "1", then the client device may display yet another indicator (e.g. half of a blue dot) adjacent to digital media files associated with such values. The client device may further display an indicator of time remaining for playing the digital media file, which may be substantially related to the values for "has been played" and/or "number of plays" for the digital media file.

The server record 395 may further comprise respective timestamps, for indicating time of last user actions corresponding to each of the particular media files. The timestamps may be used by the playback status metadata manager 314 for resolving possible conflicts in updates, which may be received from the client devices. The playback status metadata manager 314 may compare timestamps. The playback status metadata manager 314 may use a "last user action wins" strategy for resolving conflicts. Furthermore, the playback status metadata manager 314 may determine age of each of the server records and/or may determine number of server records. In managing server records, the playback status metadata manager 314 may evict records from the database based on comparison to one or more threshold values such as maximum permitted record age and/or maximum permitted number of records.

Figure 3A:
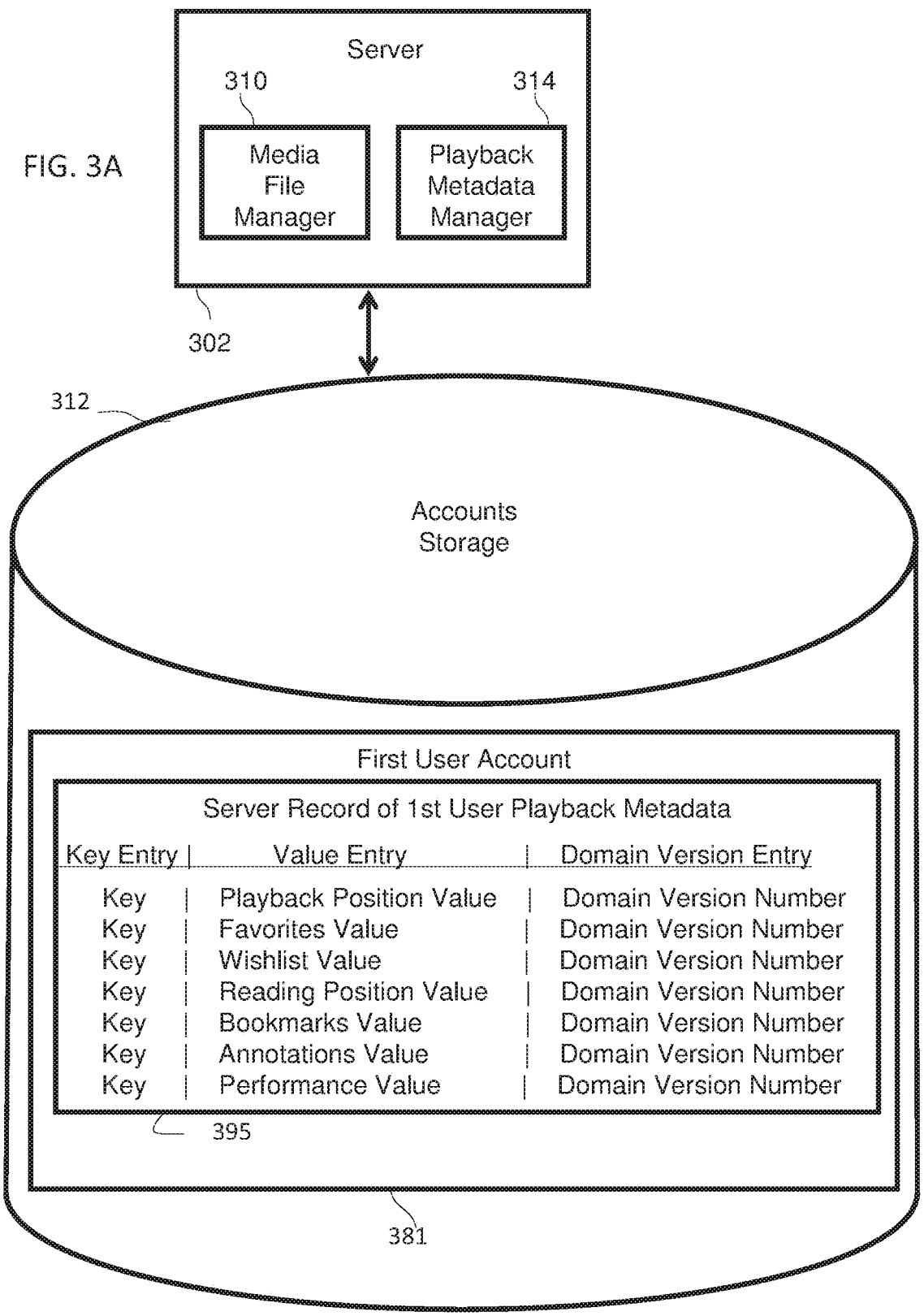
Figure 3C:
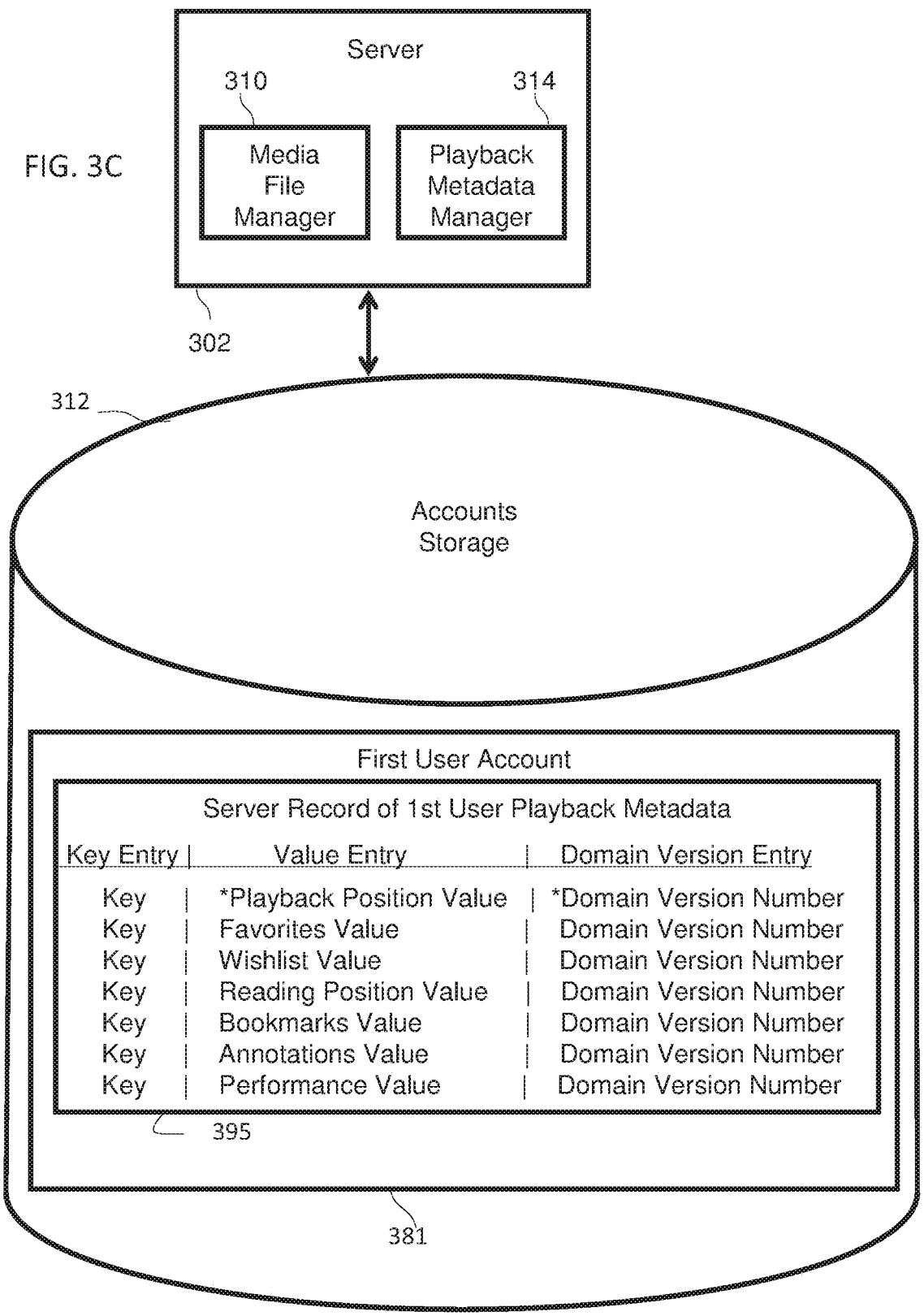

FIG. 3B shows the playback status metadata manager 314 of server computer 302 receiving the first write request 371 for playback status metadata from the first client device of the first user. FIG. 3C shows the playback status metadata manager 314 of server computer 302 updating server record 395 of the playback status metadata of the first user in response to the first write request 371 just discussed with respect to FIG. 3B. In the figures, single asterisks "*" are used to representatively illustrate a single update to the playback position value and the domain version number of the playback status metadata.

Figure 3D:
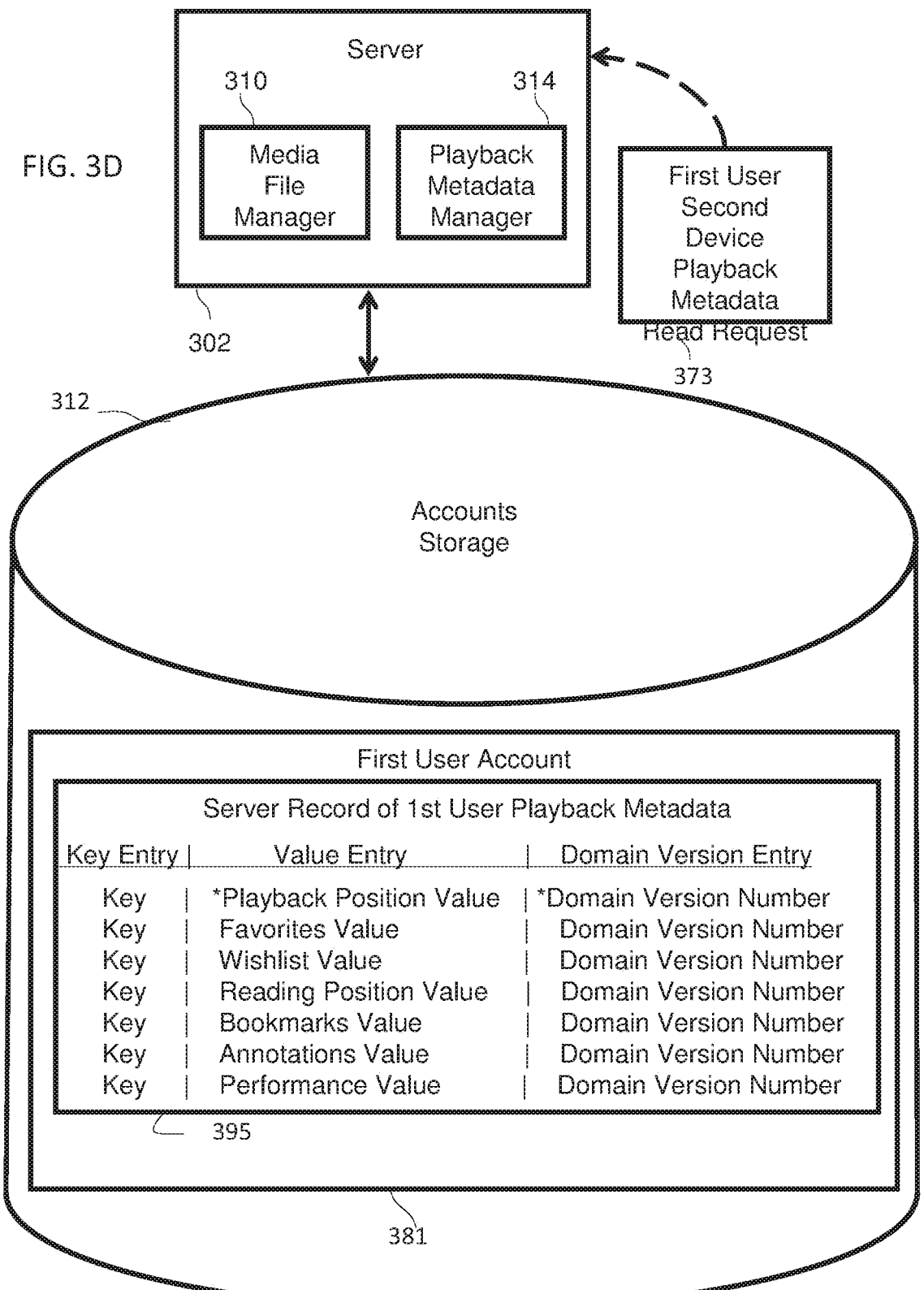
Figure 3E:
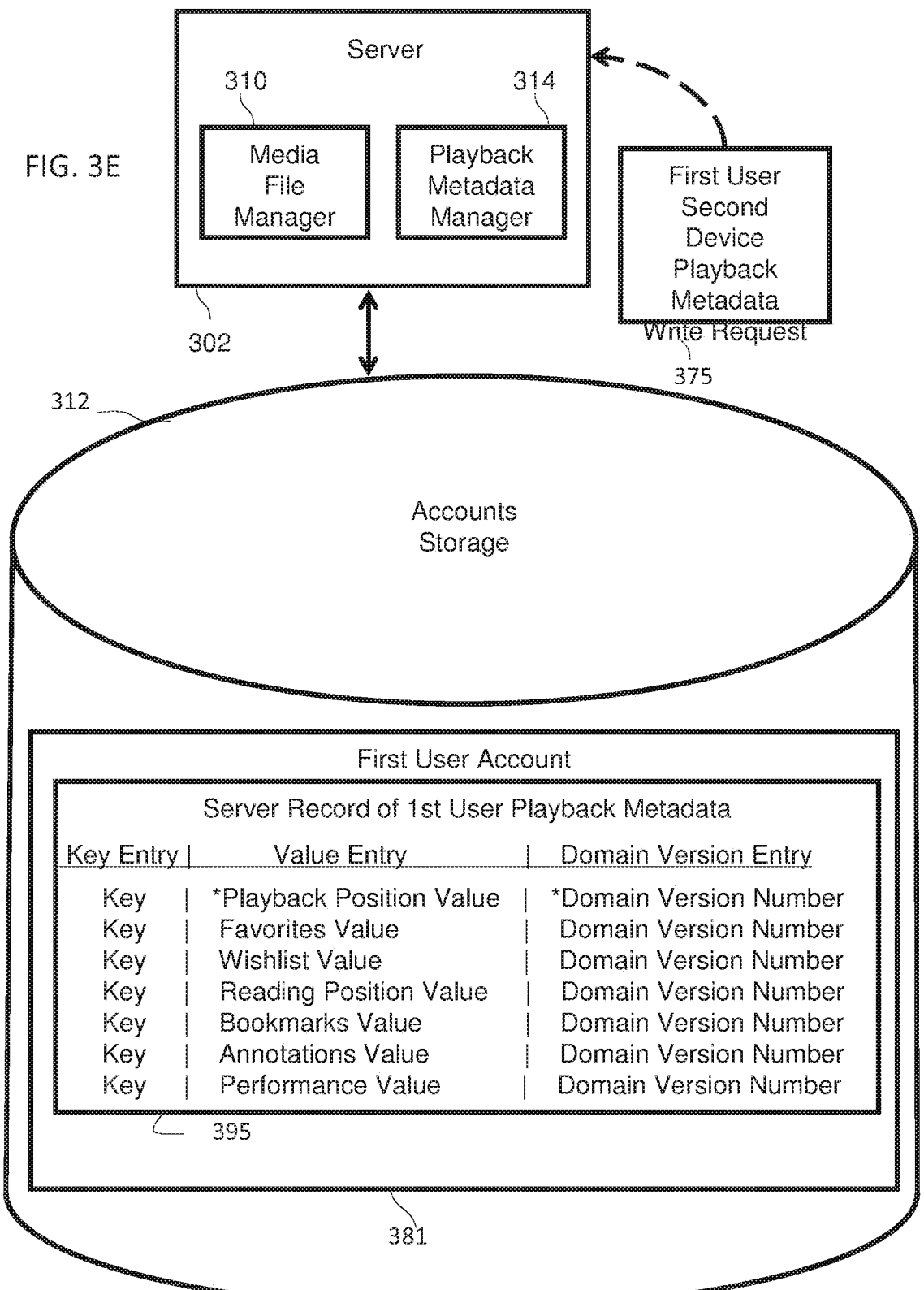
Figure 3G:
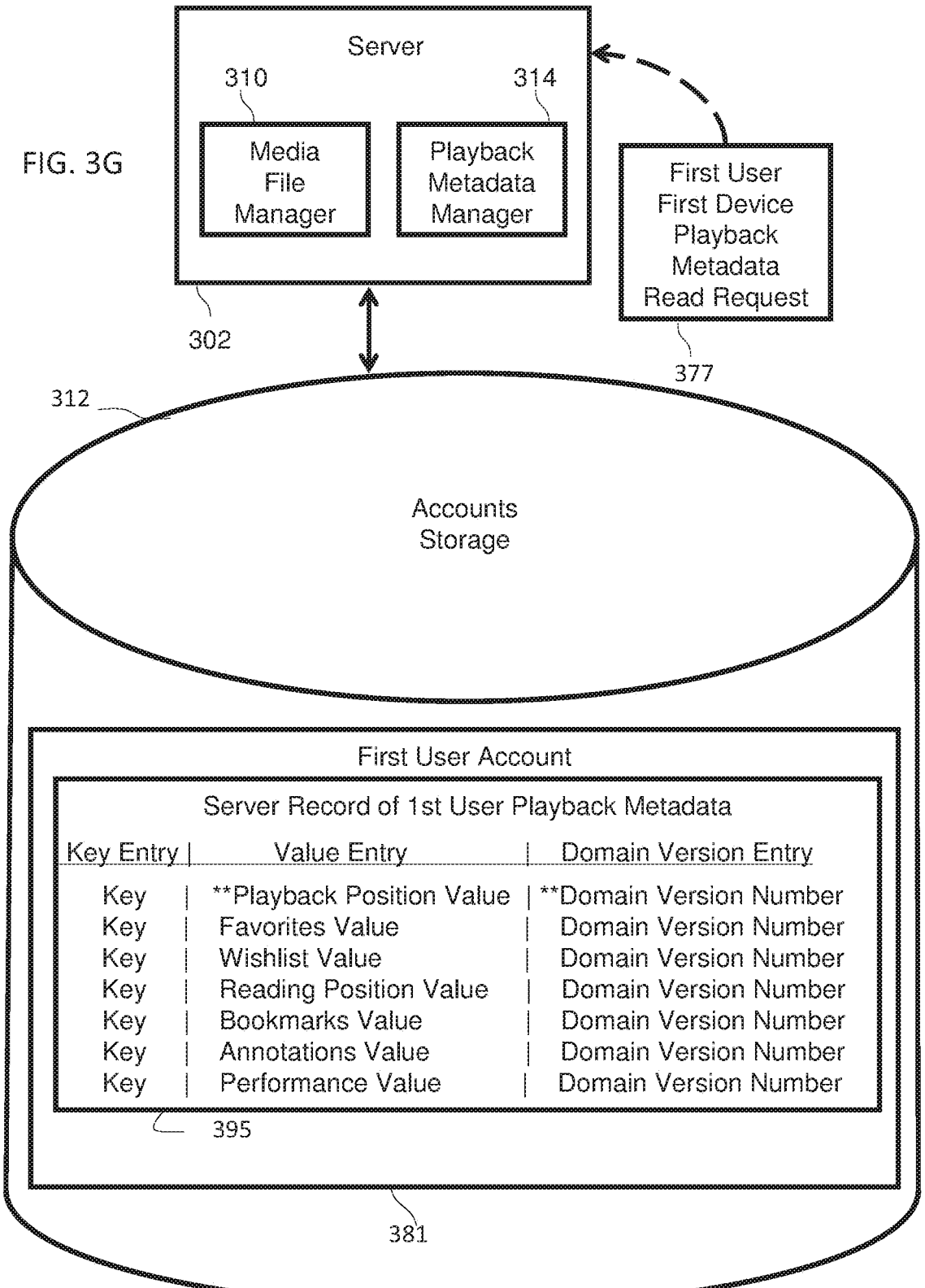

FIG. 3D shows the playback status metadata manager 314 of server computer 302 receiving the first read request 373 for playback status metadata from the second client device of the first user. As a general matter, in response to its read request, a client device may receive playback status metadata from the server computer. The client device may locally store playback status metadata received from the server computer. In some cases, the digital media file corresponding to the received playback status metadata may be absent from the client device. For example, a client device (e.g. the second client device of the first user) may receive a response to its read request 373 from the server computer 302, and the client device may locally store playback status metadata received from the server computer 302, even though the digital media file corresponding to the playback status metadata may be absent from the client device (e.g. the second client device of the first user). FIG. 3E shows the playback status metadata manager 314 of server computer 302 receiving a write request 375 for playback status metadata from the second client device of the first user. FIG. 3F shows the playback status metadata manager 314 of server computer 302 updating server record 395 of the playback status metadata of the first user in response to the write request 375 just discussed with respect to FIG. 3E. In the figures, double asterisks "**" are used to representatively illustrate a second update to the playback position value and the domain version number of the playback status metadata. FIG. 3G shows the playback status metadata manager 314 of server computer 302 receiving a read request 377 for playback status metadata from the first client device of the first user.

FIG. 4 is a detailed diagram illustrating an example of the first write request 471 for playback status metadata from the first client device of the first user, as shown previously in FIG. 3B. The first write request may include the device identification number of the first client device of the first user. For example, the first client device of the first user may have a client device identification number "441029" as shown in FIG. 4. As mentioned previously, using associations that may be recorded in the first user device record, the server computer can identify the first user and/or first user account when any of the client devices of the first user access the server computer using device identification numbers of such client devices of the first user.

The first write request 471 may have key entries of keys related to playback status metadata of the first user; value entries of values related to playback status metadata of the first user; and base version entries of base version numbers related to playback status metadata on the first client device of the first user. The first write request 471 may have associations between keys related to playback status metadata of the first user, values related to playback status metadata of the first user and base version numbers related to playback status metadata of the first client device, as illustrated using rows in FIG. 4. In other words, in FIG. 4 each row of key, value and base version number illustrates an association between that key, value and base version number.

Additionally, while the playback position value of the playback status metadata is shown with a single asterisk "*", so as to representatively illustrate in FIG. 4 that the playback position value has been updated. FIG. 4 also shows a favorites value of the playback status metadata, which may provide information relating to how the first user favors the media item corresponding such playback status metadata. A wish list value of the playback status metadata may provide information relating to how the first user prioritizes in a wish list the media item corresponding to such playback status metadata. A reading position value of the playback status metadata may provide information relating where the first user has paused reading an electronic book media item corresponding such playback status metadata. A bookmarks value of the playback status metadata may provide information relating positions of particular interest to the first user reading an electronic book media item corresponding to such playback status metadata. An annotations value of the playback status metadata may provide information relating annotations of the first user made during playback of the media item corresponding to such playback status metadata. A performance value of the playback status metadata may provide information relating client device performance experienced by the first user during playback of the media item corresponding to such playback status metadata.

The first write request 471 for playback status metadata may identify media content. In particular, each of the keys of the first write request 471 for playback status metadata shown in FIG. 4 may comprise media file identification numbers. Each of the media file identification numbers may uniquely identify a corresponding digital media file for a corresponding media item. In the example discussed previously, the media file identification number "5512345" identified the digital media for the particular video media item.

Further, each of the keys of the first write request 471 for playback status metadata shown in FIG. 4 may comprise a namespace designation, which may comprise one or more of various playback status metadata type namespaces that relate to the playback status metadata. For example, the first write request may comprise a designation of a playback position namespace (e.g. "position") that relates to the playback position value in the playback status metadata for the particular video item. In addition, the keys in FIG. 4 may designate a favorites namespace, a wish list namespace, a reading position namespace, a bookmarks namespace, an annotations namespace, and/or a performance namespace.

Figure 5:
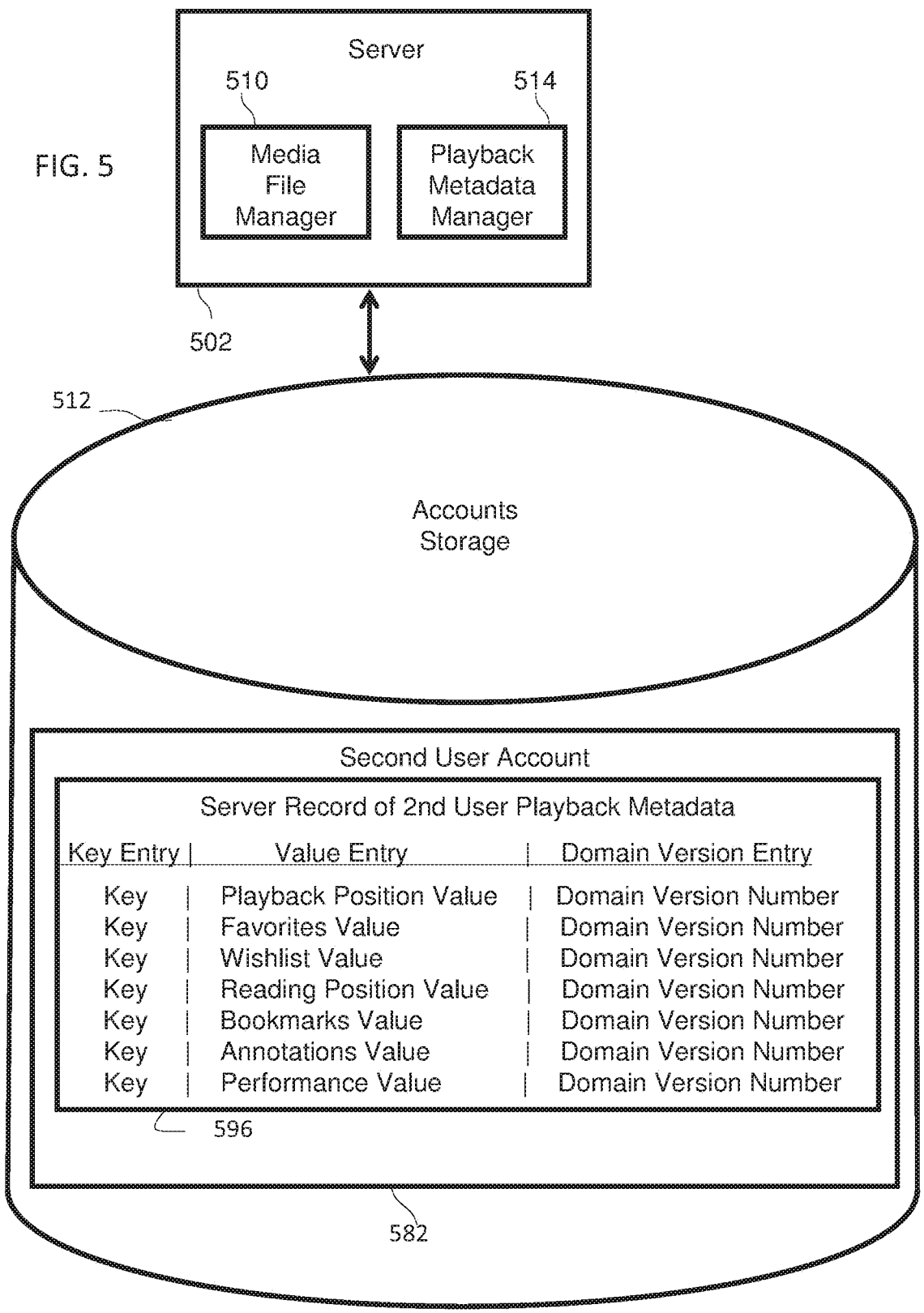
FIG. 5 is simplified, more detailed diagram illustrating the server, accounts storage and in particular the second user account shown in FIG. 2.

FIG. 5 is simplified, more detailed diagram illustrating the server, accounts storage and in particular the second user account shown in FIG. 2. FIG. 5 shows media file manager 510 and playback status metadata manager 514 of server computer 502. As shown in FIG. 5, the playback status metadata manager 514 of server computer 502 may be coupled to accounts storage 512 for accessing and/or retrieving and/or updating the server record 596 of the second user playback status metadata in the second user account 582.

The server record 596 may have key entries of keys related to playback status metadata of the second user; value entries of values related to playback status metadata of the second user; and domain version entries of domain version numbers related to playback status metadata in the server record. The server record 596 may have associations between keys related to playback status metadata of the second user, values related to playback status metadata of the second user and domain version numbers related to playback status metadata in the server record, as illustrated using rows in the figures. In other words, in FIG. 5 each row of key, value and domain version number illustrates an association between that key, value and domain version number.

Figure 6:
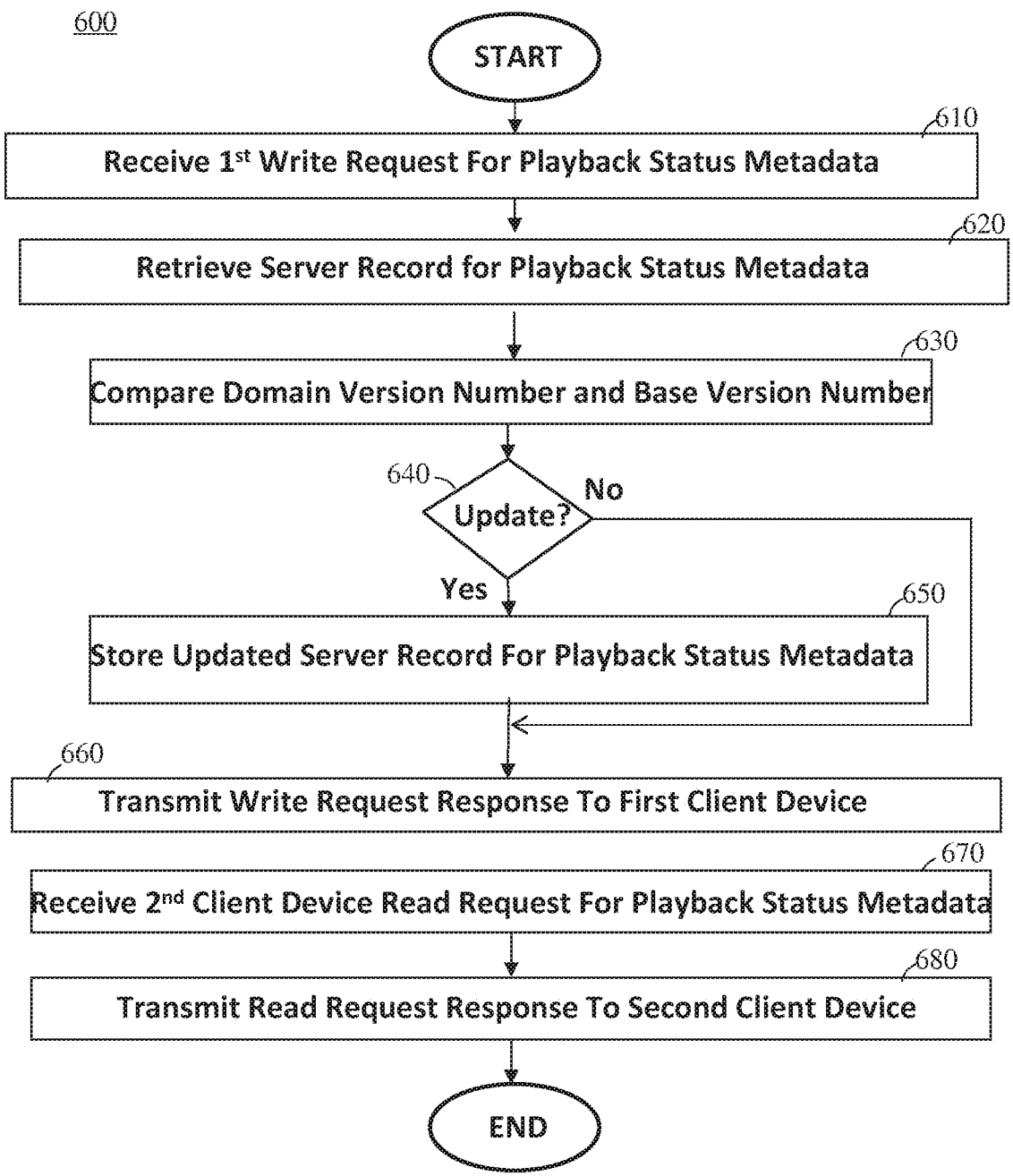
FIG. 6 is a flow diagram of a process for unifying playback status access and/or updating playback status according to some embodiments.

FIG. 6 is a flow diagram of a process 600 for unifying playback status access and/or updating playback status according to some embodiments. The process 600 is, for example, performed by a network-based server, such as the server computer 102 illustrated in FIG. 1.

Initially the server computer may receive 610 a write request for playback status metadata from a first client device of a first user. The process 600 may continue as the server computer may retrieve 620 a server record for playback status metadata. The process 600 may continue as the server computer may compare 630 a domain version number of the server record and a base version number of the write request.

The process 600 may continue to a decision 640. At the decision 640 the server computer may determine whether to update the server record, based at least in part upon the comparison of the base version number of the playback status metadata of the write request and the domain version number of the server record. If the decision is yes, then the process may update the server record and the process 600 may continue as the server computer may store 650 the updated server record for playback status metadata. Otherwise, if the decision is no, then the storage of the updated server record may be omitted.

In any case, the process 600 may continue as the server computer may transmit 660 a write request response to the first client device. The process 600 may continue as the server computer may receive 670 a read request for playback status metadata from a second client device. The process 600 may continue as the server computer may transmit 680 a read request response to the second client device. Once the read request response has been transmitted the process 600 may end.

Figure 7:
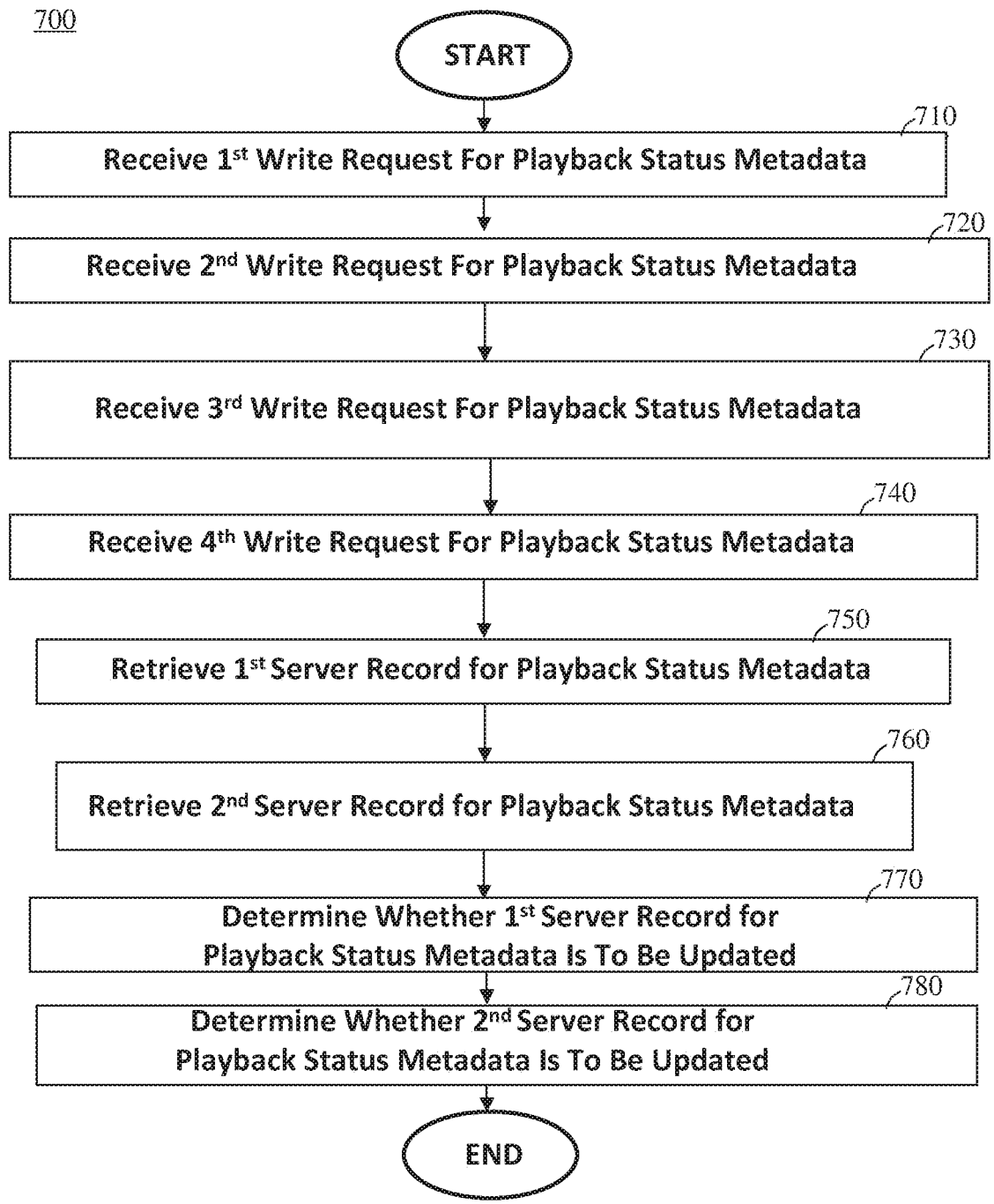
FIG. 7 is a flow diagram of a process for managing playback status access for a plurality of client devices according to one embodiment.

FIG. 7 is a flow diagram of a process 700 for managing playback status access for a plurality of client devices according to one embodiment. The process 700 is, for example, performed by a network-based server, such as the server computer 102 illustrated in FIG. 1. Initially, the server computer may receive 710 a first write request for playback status metadata from a first client device of a first user.

The process 700 may continue as the server computer may receive 720 a second write request for playback status from a first client device of a second user. The process 700 may continue as the server computer may receive 730 a third write request for playback status metadata from a second client device of the first user. The process 700 may continue as the server computer may receive 740 a fourth write request for playback status metadata from a second client device of the second user.

The process 700 may continue as the server computer may retrieve 750 a first server record relating to playback status metadata of the first user. The process 700 may continue as the server computer may retrieve 760 a second server record relating to playback status metadata of the second user.

The process 700 may continue as the server computer may determine 770 whether the first server record relating to playback status metadata of the first user is to be updated. The process 700 may continue as the server computer may determine 780 whether the second server record relating to playback status metadata of the second user is to be updated. Once the server computer has determined whether the second server record is to be updated, the process 700 may end.

The invention can be implemented by software, hardware or a combination of hardware and software. The invention can also be embodied as computer readable code on a tangible (e.g., non-transitory) computer readable medium. The tangible computer readable medium is any data storage device that can store data which can thereafter be read by a computer system. Examples of the computer readable medium include read-only memory, random-access memory, CD-ROMs, DVDs, magnetic tape and optical data storage devices.

The advantages of the invention are numerous. Different aspects, embodiments or implementations may yield one or more of the following advantages. One advantage of embodiments of the invention is that access to playback status may be unified across a plurality of client devices. Another advantage of embodiments of the invention is that playback status access may be managed.

The various aspects, embodiments, implementations or features of the invention can be used separately or in any combination.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. For example, while embodiments employing client devices transmitting read requests to the server have been discussed in detail, the invention is not limited to such polling arrangements of such embodiments. Furthermore, in other embodiments, the playback status metadata manager of the server may transmit push notifications to the client devices. More particularly, the playback status metadata manager of the server may push updates of the playback status metadata to the client devices. Hence, all suitable modifications and equivalents may be resorted to as falling within the scope of the invention.

The invention claimed is:

1. A method for unifying playback status among a first and second device, comprising:
    receiving, by a computing system, from the first client device, a first write request to update playback status metadata for a first media content, the first write request comprising an updated playback value indicating a point of the first media content at which playback of the first media content ceased during the playback of the first media content on the first client device, wherein the write request identifies a base version number corresponding to the updated playback value;
    retrieving a record associated with a first user account for the first media content, wherein the record comprises a domain version number related to a recorded playback value for the first media content;
    determining that the recorded playback value was recorded subsequent to the updated playback value by comparing the domain version number and the base version number; and
    in response to determining that the recorded playback value was recorded subsequent to the updated playback value, transmitting a version conflict notification to the first client device.

2. The method of claim 1, further comprising:
    receiving, from the first client device, a second write request to update playback status metadata for a first media content, the second write request comprising a further updated playback value indicating a further point of the first media content at which playback of the first media content ceased during a second playback of the first media content on the first client device, wherein the write request identifies a second base version number corresponding to the further updated playback value;
    determining that the recorded playback value was recorded prior to the further updated playback value by comparing the domain version number and the second base version number; and
    in response to determining that the recorded playback value was recorded prior to the further updated playback value, updating, on the computing system, the record associated with a first user account for the first media content to include the further updated playback value.

3. The method of claim 2, further comprising:
    receiving, from a second client device associated with the first user account, a first read request of the updated playback value, the read request comprising the media file identifier;
    retrieving the further updated playback value from the updated record associated with the first user account for the first media content; and
    transmitting the further updated playback value to the second client device, such that the further updated playback value indicates a point of the first media content from which to resume playback on the second client device.

4. The method of claim 1, wherein the first media content is stored in a media file library of at least one of the first client device or the second client device.

5. The method of claim 1, further comprising:
    synchronizing, by a computing system, a listing of a collection of media content available to a first user account across a plurality of devices associated with the first user account, wherein a first media content is at least partially stored on the second client device.

6. The method of claim 1, wherein the first read request is sent from the second client device is in response to a media activity associated with the first media content on the second client device.

7. The method of claim 1, wherein the first media content comprises one or more selected from a group consisting of: image data, text data, audio data, and video data.

8. A non-transitory computer readable medium comprising computer readable code executable by one or more processors to:
    receive, by a computing system, from the first client device, a first write request to update playback status metadata for a first media content, the first write request comprising an updated playback value indicating a point of the first media content at which playback of the first media content ceased during the playback of the first media content on the first client device, wherein the write request identifies a base version number corresponding to the updated playback value;
    retrieve a record associated with a first user account for the first media content, wherein the record comprises a domain version number related to a recorded playback value for the first media content;
    determine that the recorded playback value was recorded subsequent to the updated playback value by comparing the domain version number and the base version number; and
    in response to determining that the recorded playback value was recorded subsequent to the updated playback value, transmit a version conflict notification to the first client device.

9. The non-transitory computer readable medium of claim 8, further comprising computer readable code to:
    receive, from the first client device, a second write request to update playback status metadata for a first media content, the second write request comprising a further updated playback value indicating a further point of the first media content at which playback of the first media content ceased during a second playback of the first media content on the first client device, wherein the write request identifies a second base version number corresponding to the further updated playback value;

determine that the recorded playback value was recorded prior to the further updated playback value by comparing the domain version number and the second base version number; and in response to determining that the recorded playback value was recorded prior to the further updated playback value, update, on the computing system, the record associated with a first user account for the first media content to include the further updated playback value.

10. The non-transitory computer readable medium of claim 9, further comprising computer readable code to:

receive, from a second client device associated with the first user account, a first read request of the updated playback value, the read request comprising the media file identifier;

retrieve the further updated playback value from the updated record associated with the first user account for the first media content; and transmit the further updated playback value to the second client device, such that the further updated playback value indicates a point of the first media content from which to resume playback on the second client device.

11. The non-transitory computer readable medium of claim 8, wherein the first media content is stored in a media file library of at least one of the first client device or the second client device.

12. The non-transitory computer readable medium of claim 8, further comprising computer readable code to:

synchronize, by a computing system, a listing of a collection of media content available to a first user account across a plurality of devices associated with the first user account, wherein a first media content is at least partially stored on the second client device.

13. The non-transitory computer readable medium of claim 8, wherein the first read request is sent from the second client device is in response to a media activity associated with the first media content on the second client device.

14. The non-transitory computer readable medium of claim 8, wherein the first media content comprises one or more selected from a group consisting of: image data, text data, audio data, and video data.

15. A system for media synchronization, comprising:
one or more processors; and
a non-transitory computer readable medium comprising computer readable code executable by the one or more processors to:

receive, by a computing system, from the first client device, a first write request to update playback status metadata for a first media content, the first write request comprising an updated playback value indicating a point of the first media content at which playback of the first media content ceased during the playback of the first media content on the first client device, wherein the write request identifies a base version number corresponding to the updated playback value;

retrieve a record associated with a first user account for the first media content, wherein the record comprises a domain version number related to a recorded playback value for the first media content;

determine that the recorded playback value was recorded subsequent to the updated playback value by comparing the domain version number and the base version number; and in response to determining that the recorded playback value was recorded subsequent to the updated playback value, transmit a version conflict notification to the first client device.

16. The system of claim 15, further comprising computer readable code to:

receive, from the first client device, a second write request to update playback status metadata for a first media content, the second write request comprising a further updated playback value indicating a further point of the first media content at which playback of the first media content ceased during a second playback of the first media content on the first client device, wherein the write request identifies a second base version number corresponding to the further updated playback value;

determine that the recorded playback value was recorded prior to the further updated playback value by comparing the domain version number and the second base version number; and in response to determining that the recorded playback value was recorded prior to the further updated playback value, update, on the computing system, the record associated with a first user account for the first media content to include the further updated playback value.

17. The system of claim 16, further comprising computer readable code to:

receive, from a second client device associated with the first user account, a first read request of the updated playback value, the read request comprising the media file identifier;

retrieve the further updated playback value from the updated record associated with the first user account for the first media content; and transmit the further updated playback value to the second client device, such that the further updated playback value indicates a point of the first media content from which to resume playback on the second client device.

18. The system of claim 15, wherein the first media content is stored in a media file library of at least one of the first client device or the second client device.

19. The system of claim 15, further comprising computer readable code to:

synchronize, by a computing system, a listing of a collection of media content available to a first user account across a plurality of devices associated with the first user account, wherein a first media content is at least partially stored on the second client device.

20. The system of claim 15, wherein the first read request is sent from the second client device is in response to a media activity associated with the first media content on the second client device.

* * * * *